Figure 1:
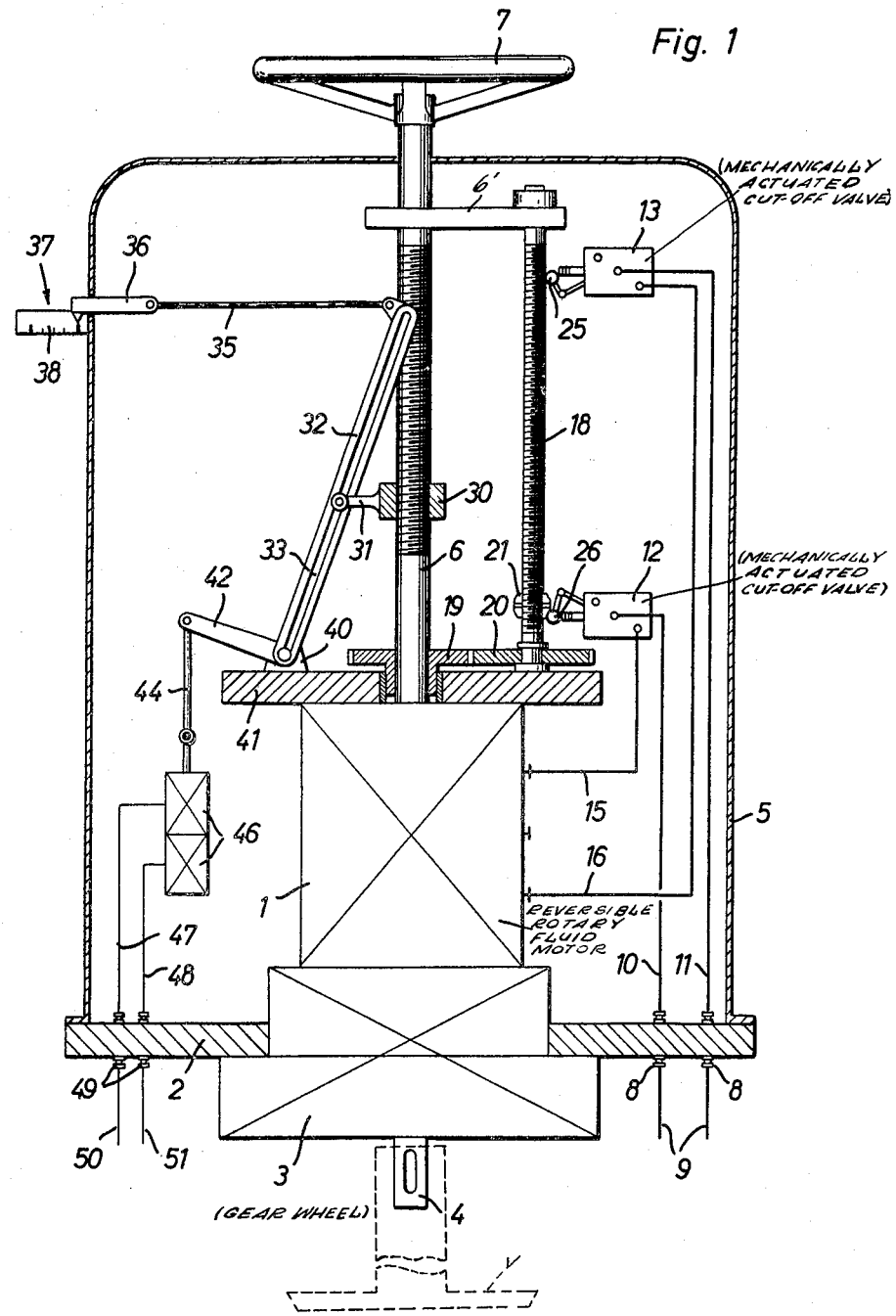

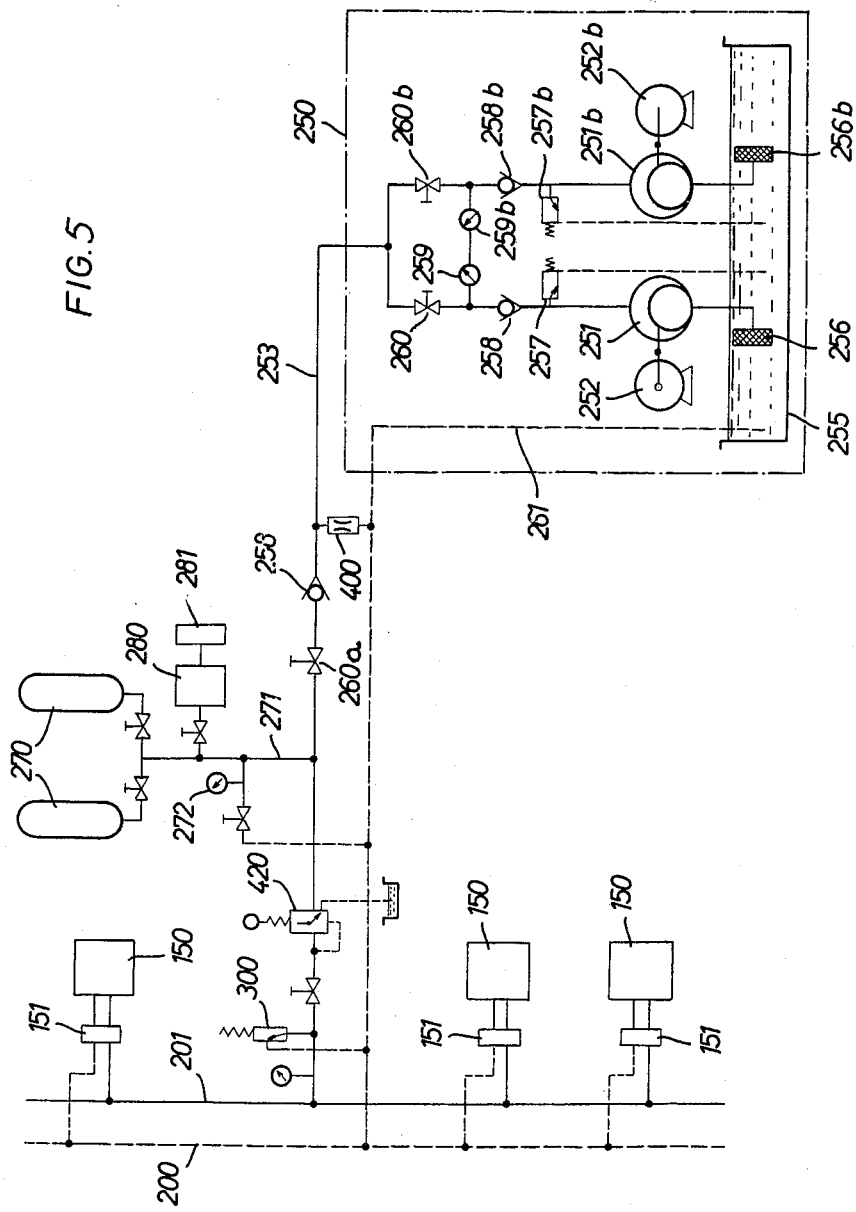

United States Patent Office 3,205,784
Patented Sept. 14, 1965

3,205,784
HYDRAULIC ACTUATING MEANS FOR VALVES
Hugo Ebersold, Mannheim-Neuostheim, Germany, assignor to Vereinigte Armaturen-Gesellschaft m.b.H., Mannheim, Germany
Filed Apr. 9, 1962, Ser. No. 186,035
Claims priority, application Germany, Apr. 11, 1961, 20,478; Oct. 16, 1961, 21,473
11 Claims. (Cl. 91—58)

The present invention relates to the art of valve actuation.

More particularly, this invention relates to hydraulic actuating means for valves, especially valves controlling loading and unloading of tankers.

The invention specifically relates to the hydraulic actuation of tanker valves, such as gate valves and in which a rotary hydraulic motor is utilized to provide the power impulses required to open and close such valves. It is known that valves for tankers can be actuated by hydraulic servo motors of the ram or piston type. Such motors have high efficiency but they are of relatively large size or dimensions particularly when they are provided with means for remotely indicating the valve condition. Accordingly, it has been proposed to actuate tanker valves by rotary hydraulic motors which as is known are of compact construction. Such rotary hydraulic motors may be coupled directly to the valve spindle or indirectly thereto via reduction gearing.

It is further known that tanker valves require less force to move them to closed conditions than is required to move them to open condition. If the valves are closed with the same force as is available to move them to open condition then there is the danger that the valves will become firmly jammed or wedged in their closed position so that it may not be possible to again open them with certainty. To overcome this disadvantage complicated arrangements have been proposed to render the effective forces developed by the hydraulic motor different during a closing operation as compared with an opening operation, by providing, for example, a reducing valve in a hydraulic line that is active during a closing operation. Such an arrangement, however, is very susceptible to disturbance so that it is not suitable for normal rough usage or normal working conditions on shipboard since a factor that must be considered is the alteration of the nature of the hydraulic oil due to the large temperature variations to which an oil tanker is or may be subjected.

Accordingly, it is an object of the present invention to provide a hydraulic actuating means for valves, especially oil tanker valves, which can be employed universally regardless of whether the valve is installed directly within an oil bunker or tanker compartment so that it is submerged in the contents of the tanker or compartment, or whether the valve is installed in a pump housing or in a housing on the deck of the tanker. Consistent with this object the present invention provides for satisfactory opening and closing of a tanker valve or valves under all operating conditions and further incorporates means for providing a reliable indication of a valve setting even under the most difficult circumstances encountered on shipboard.

It is a further object of the present invention to provide hydraulic actuating means for valves, particularly tanker valves, which is so constructed and arranged that reliable control of the hydraulic servo motors is ensured and the actuating means can be accommodated in minimum space requirements.

In instances where the tanker incorporates a plurality of control valves for loading or unloading the cargo of oil, it is usual to provide a common hydraulic supply source for actuation of a plurality of valves. Appreciable difficulties arise under these circumstances since the various valves can be actuated completely without control. It may happen that one valve needs to be actuated from a remote distance. Further, it may happen that a large number of valves need to be suddenly actuated at the same time. In all cases there must be a certainty that sufficient actuating pressure is available in the hydraulic actuating system. Practice has shown that it is practically impossible to have available a suitable feed pump which meets all requirements. To overcome these difficulties intermittently operating feed pumps have been provided which can be cut in or cut out under the control of a pressure responsive device. In order to maintain a definite pressure balance in the supply line, oil pressure accumulators have been included between a feed pump and a servo motor(s) to ensure when said pump is switched off and oil under pressure is being utilized by a servo motor, the supply pressure in the supply line does not immediately fall below a necessary minimum value. For control purposes the pressure responsive device is so constructed that the feed pump is cut in with the aid of a pressure responsive switch when the pressure in the supply line falls below a minimum value, while the pump is cut out when a maximum value has been reached. There must necessarily be a sufficient difference between the minimum and maximum values. Attempts have been made to maintain these differences as small as possible. Such attempts however have been limited. It has been found in practice that due to these conditions, the situation frequently arises in which, with the feed pump cut out upon a maximum value being reached during utilization of oil by the servo motor a condition can arise in which the supply system begins to hunt i.e. the feed pump is periodically cut in and cut out again at short time intervals or intermittently. This action provides variation in the feed line pressure which has a disadvantageous effect on the various components of the system including the servo motor(s), the modifying action of the accumulators notwithstanding. The reason for this variation is that generally the feed pump is driven by an electric motor. The hunting of the pump and the driving motor therefor will also produce corresponding potential variations in the supply circuit of the pumps, these variations adversely affecting the electrical supply system. Accordingly, it is a further object of the invention to provide hydraulic actuating means for tanker valves which includes electric motor driven feed pump means and which actuating means incorporates components ensuring that pressure variations of short duration in the hydraulic system do not act on the driving motor of the said pump means.

The hydraulic actuating means in each aspect of the present invention is distinguished from known valve actuators by the fact that the hydraulic motor, with the reduction gearing, if the same is desirable, together with components for controlling the motor operation is assembled as a self-contained unit in a common casing sealed from the exterior and filled with oil or similar protective fluid.

This casing ensures that atmospheric conditions or influences, especially any corrosive effects normally expected on sea going vessels due to salt conditions has no effect on the components of the actuating means and their operation. This novel construction of the hydraulic actuating means provides a unit which can be universally employed and which can be utilized without difficulty in association with control valves already installed, since it is only necessary to provide a coupling between the shaft driven by the unit arrangement of the hydraulic actuating means and the spindle of the valve and also pipe connections for the necessary hydraulic lines, to enable the unit to be placed in service.

The invention has for a further object to provide an arrangement that ensures certain closing or reopening of the valve or valves independently of the atmopheric conditions influencing the hydraulic oil or fluid and in which the control of the hydraulic motor at least for the open condition of the valve is effected by a mechanical impact or end position valve arranged within the sealed casing and actuated by a valve actuator such as a cam movable in response to operation of the hydraulic motor. It is advantageous to provide an arrangement in which such a cam initially adjusts the valve within the casing to prevent a reduced flow so that the movement of the main valve is braked and only thereafter is the hydraulic motor cut out. A specific object is to provide such an arrangement in which a spindle is provided within the casing for rotation in response to the rotation of the hydraulic motor and a nut which is axially moveable on such spindle functions as the cam.

In order to ensure that the hydraulic actuating means can be completely assembled into a constructional unit, and in order to avoid adjustments normally necessary upon installation of such a unit in a tank, of the control members which are effective for setting up the closed position of the main valve to be actuated, in a preferred form of the invention, a shut-off valve for controlling the hydraulic servo motor is arranged in the pipe which is fed with oil under pressure during the opening operation of the said main valve, the said shut-off valve being closed by a cam operated by the servo motor when the open setting of the main valve is reached, and a pressure reducing valve is included in the servo motor pipe which is fed with oil under pressure during the closing operation of the main valve, so that the supply pressure during the main valve closing operation is lower by a predetermined amount than the supply pressure during the main valve opening operation. The control of the servo motor during the opening operation, which as a rule is not so critical, may be effected with the aid of an end position or impact valve controlled by a cam. In contrast, in this embodiment of the invention positive cutting out of the servo motor in connection with the control during the closing operation is obviated. The main valve is therefore shifted by the servo motor into its closed position until the torque of the servo motor no longer suffices for further movement thereof. However, in order to ensure that the torque of the servo motor suffices for the subsequent opening operation, in order to shift the main valve out of its tightly closed position, care is taken that the torque upon movement of the main valve into its closed position is lower by an appreciable amount than the torque available from the servo motor during the opening operation. This novel construction appreciably simplifies the control operation and above all results in markedly reduced space requirement for the whole control means including the servo motor. Thus the prefabricated unit can be employed for the control of valves in an appreciably wider field than hitherto.

The invention further provides a hydraulic remote indicating device, the impulse emitter of which is likewise enclosed in the common oil-filled casing so that it forms a part of the self-contained unit and which upon installation of the unit only requires the connecting up of pipes.

Figure 2:
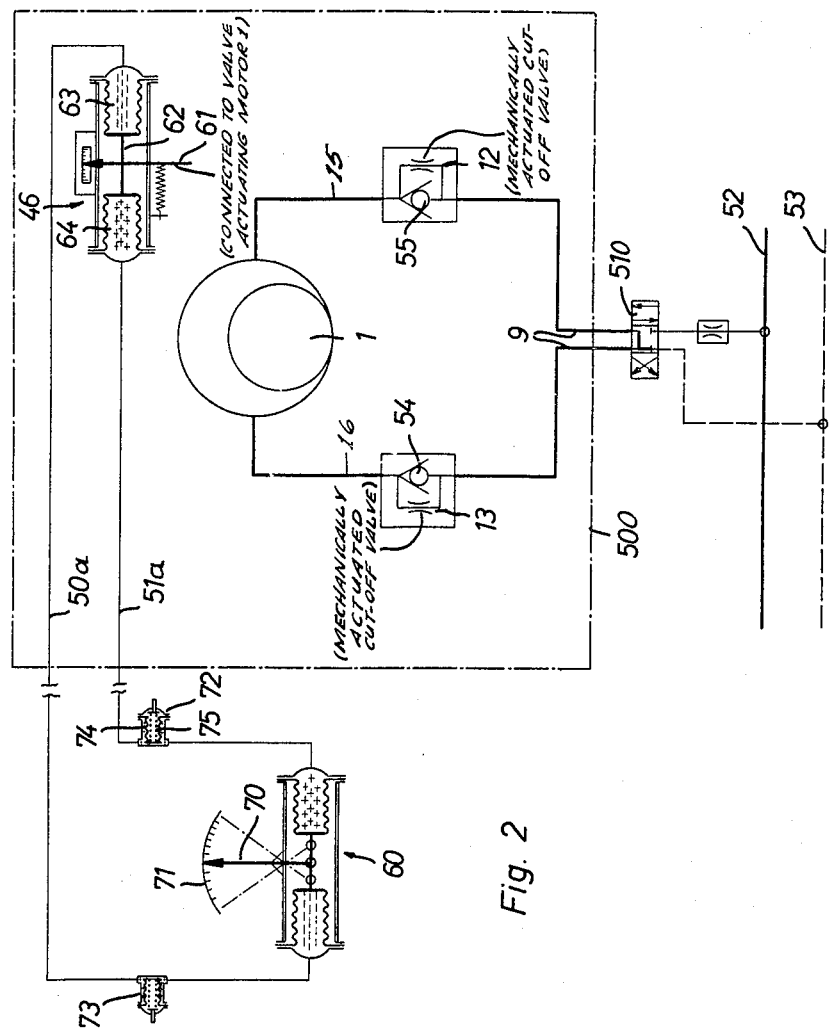
Figure 3:
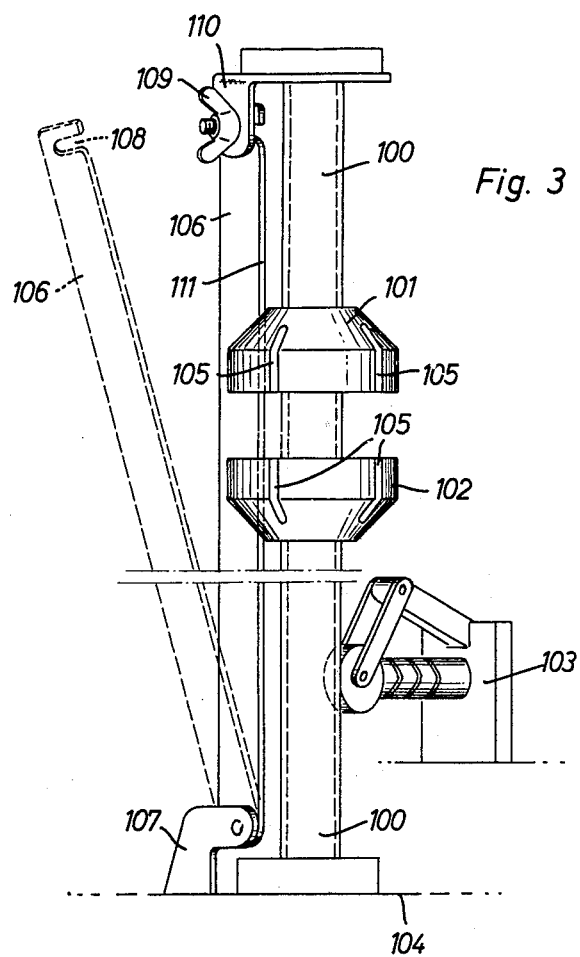
Figure 4:
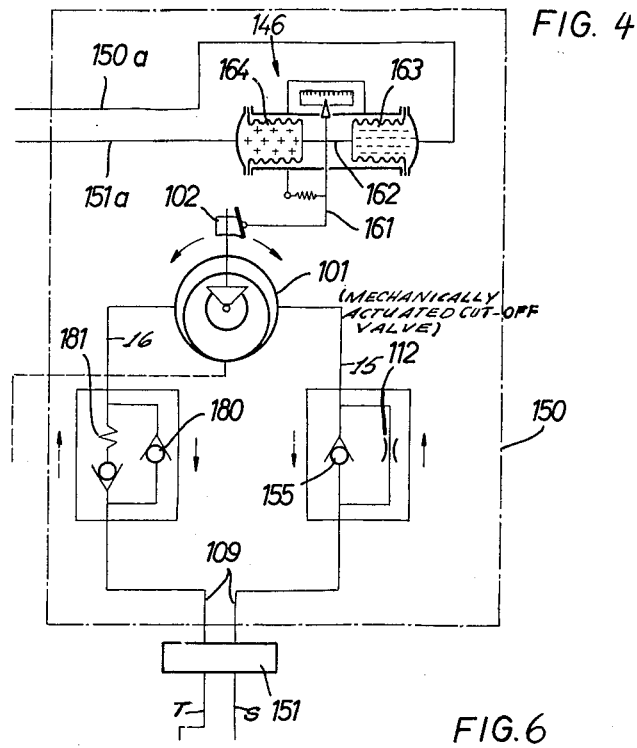
Figure 6:
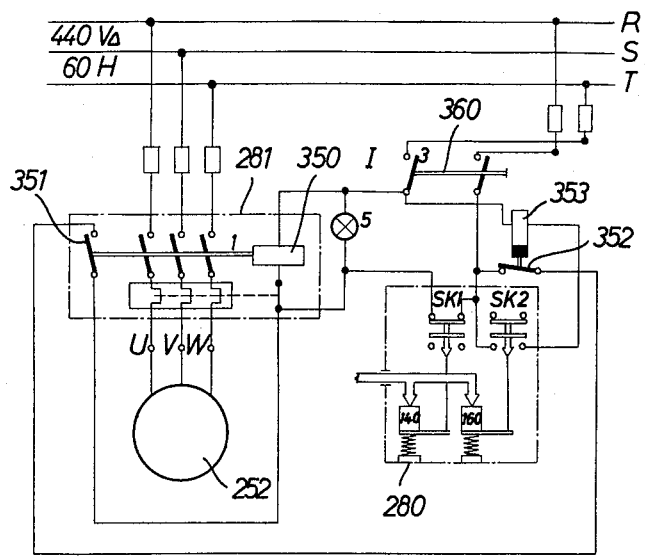

Further and more specific objects of the invention will be apparent from the following description taken in connection with the accompanying drawings in which:

FIGURE 1 is a view partly in elevational partly in vertical section and with certain parts shown diagrammatically illustrating one embodiment of a constructional unit incorporating hydraulic valve actuating means of the invention, FIGURE 2 is a diagrammatical view illustrating certain of the hydraulic components of the invention in association with the various means that are to be coupled by conduits to the constructional unit of FIGURE 1, FIGURE 3 is a view illustrating a modified component of the arrangement shown in FIGURE 1, FIGURE 4 is a diagrammatic view illustrating a modified arrangement of the feed relationship to and from the hydraulic motor that actuates the tanker valve and further diagrammatically illustrating a modified form of a valve setting indicator, FIGURE 5 is a diagrammatic view illustrating a hydraulic supply and control system for association with a plurality of hydraulic motor actuated valves, and FIGURE 6 is a diagrammatic view illustrating a pressure responsive or sensitive switching means which can be incorporated in the hydraulic system illustrated in FIGURE 5.

In the drawings, FIGURE 1, the rotary hydraulic motor is illustrated diagrammatically at 1 and is supported on base plate 2 and its shaft is coupled to a gear wheel 3 also indicated diagrammatically. If desired a reduction gear relationship can be incorporated between the shaft of the hydraulic motor and either the gear wheel 3 or between that gear wheel and a shaft 4 driven by the gear wheel. The shaft 4 has a key thereon so that it can be coupled in a known manner to the spindle of the valve, diagrammatically illustrated at V, to be controlled. It is believed obvious that the shaft portion 4 can be coupled either directly to the spindle or via immediate gearing or linkage arrangement to the spindle or other component that moves the valve to be controlled to the open and closed position. A casing 5 is secured in a fluid type manner by seals, not shown, to the base plate 2 and this casing surrounds the hydraulic motor and the parts co-operating therewith and seals them from the exterior and is filled with oil or other suitable liquid so as to protect the motor and associated components from external influences.

A screw threaded spindle 6 is connected to the rotor of the hydraulic motor and has a portion projecting through the top of casing 5 to the exterior thereof, a suitable gland or seal being provided to maintain the sealed relationship of the casing 5. A hand wheel 7 is provided at the extremity of spindle 6 so if it is desired the valve to be controlled can be operated by hand.

Suitable pipe connections or fittings 8 are associated with base plate 2 so that supply and return pipes 9 for the hydraulic actuating fluid can be coupled to the unit within the casing 5. Within the casing, pipes 10 and 11 are connected to the pipe connections or fittings 8 on the interior of the base plate 2 and these pipes communicate respectively with mechanical impact valves 12 and 13. These valves are fixedly supported by means not shown in spaced relationship within the casing 5. Further pipes or conduits 15 and 16 lead from the casing of the respective valves 12 and 13 to the reversible hydraulic motor 1.

Mounted to extend parallel to spindle 6 is another externally threaded spindle 18. This spindle 18 is supported by a bracket arm 6' that journals the upper end of spindle 6. The lower end of spindle 18 has splined thereto a gear wheel 20 which is in mesh with the gear wheel 19 splined to spindle 6 so that spindle 18 is rotated synchronously with spindle 6 by the rotor of the hydraulic motor 1. On spindle 18 is a nut 21 suitably secured against rotation so that it moves axially along the spindle 18 as it rotates for co-operation with valve actuating members 26, 25 that control the valves 12 and 13, respectively. The position of the nut 21 on spindle 18 corresponds to the setting of the hydraulic motor and the arrangement is such that when this nut engages the actuators 26 or 25 the fluid flow from the source, described hereinafter, via valves 12 and 13, respectively, is first throttled and then shut off.

On spindle 6 is another nut 30 having an arm 31 extending therefrom, the outer end of which arm carries a roller or other follower means riding in a groove or slot 33 in a lever 32. This lever 32 is pivoted at its lower end to a bracket 40 that is mounted on a plate 41 that is fixed within a casing. The upper end of lever 32 has a link 35 pivotally connected thereto at one end while the other end of the link 35 is connected to an indicator member 36 that co-operates with a scale 37 having indicia 38 thereon to indicate the position of the valve to be controlled. In this connection, it is to be pointed out that the two nuts 21 and 30 may be combined in a single structure or replaced by a cam member, the position of which is altered by the operation of the hydraulic motor. Further, suitable gland or sealing means not shown are associated with the opening in the casing 5 through which the indicator 36 extends, so as to prevent leakage of the oil or other liquid that is within the casing 5.

Since in many instances it is required to indicate the condition of the valve to be controlled at a remote point, for example, it is desirous that the setting of the various valves be observed from the bridge of the ship so that they can be controlled from the bridge if necessary, the lower end of the lever 32 has an arm 42 rigidly connected therewith so that lever arms 32 and 42 constitute a bell crank lever. Pivotally connected to the outer end of the lever arm 42 is a link 44 that is pivotally coupled to a nut or other member that is movable in response to angular deviation of lever 32 so as to constitute the impulse or transmitter member of a fluid telemotor system indicated diagrammatically at 46. Pipes 47 and 48 connect the opposite sides of the transmitter member to pipe connections or fittings 49 carried by the base plate 2. Pipes such as 50 and 51 are connected between the pipe connections or fittings 49 and the receiver of the telemotor system that is positioned remotely from casing 5 so that the setting or position of the valve being controlled as shown on scale 37 is also indicated on another scale at a remote point such as the bridge of the ship.

It is therefore seen that all of the components of a hydraulic actuating means that are necessary for the operation thereof are arranged within a common casing 5 and sealed from the exterior. These components after having been assembled and put in proper relationship form a common unit which can be mounted in any desired position according to the purpose intended. In order to couple this unit to the valve to be controlled it is only necessary to connect output shaft 4 of the reduction gearing, or direct drive if that is desired, to the valve spindle or to other valve actuating linkage and also couple fluid supply and return pipes to fittings 8 and the pipes 50 and 51 of the telemotor system to fittings 49.

FIGURE 2 diagrammatically illustrates an installation of the valve actuating means according to this invention as incorporated in the hydraulic system of a tanker vessel. In this view certain components have the same reference numerals. The dot-dash line 500 encloses the components that are within the casing 5 of FIGNRE 1. The two supply and return lines 9 for the hydraulic motor indicated diagrammatically at 1 are connected to source via a manually actuated control valve 510. The lines 9 can be connected to either the pressure line 52 or the return line 53 of the hydraulic system of the vessel. Control valve 510 can be mounted externally of the casing and if desired at a remote point or at a central control station when a plurality of units are involved. Within the casing are the mechanical impact valves 12 and 13. Incorporated with each of these valves are non-return valves 55, 54 respectively. Such non-return valves are necessary because upon change over from one position to that where the valve 12 or 13 is opened and fluid is flowing into the motor in one line such as 15 then line 16 which had previously been a supply line to the motor now becomes a return line. Thus, the fluid flowing back through the valve must return through the associated non-return valve 54 because the associated impact switch member or valve actuator has closed the fluid control valve 13 in the casing.

The transmitter 46 of the telemotor system and the receiver of this system 60 are illustrated in more detail in FIGURE 2. The impulse member which is moved in accordance with the setting of the valve in response to movement of the rotor of the hydraulic motor is indicated at 61. The movement of member 61 is transmitted via a link connection 62 to two cylinder spaces 63, 64 in the form of bellows, the capacities of which are varied in the opposite direction in accordance with the particular movements of the impulse member 61. Pipes 50a and 51a extend between the bellows 63, 64 and similar bellows arrangements in the receiver 60. The movement of the bellows in the receiver is transmitted to an indicating member 70 that co-operates with a scale 71 so as to reproduce the position of the impulse member 62 as indicated on the scale 37 associated with the transmitter.

The provision of two opposite variable cylindrical spaces provided by the bellows at the transmitter and receiver ensures that faulty indications due to variations in temperature or volume in the telemotor system cannot occur since with increases or decreases in volume the forces are always balanced. However, at very high temperatures an excessive pressure could arise in the spaces encompassed by the bellows. In order to prevent this, pressure equalizing means are associated with the pipes or condiuts 50a or 51a respectively. These pressure equalizers 72, 73 include chambers within which are mounted resilient bellows 74 which, with the aid of adjustable spring means 75 and in accordance with the very flat spring rate, exert definite pressure on the oil in the telemotor indicating system. Upon any increase of volume due to change in temperature the resilient bellows in the equalizers are compressed. In this way the spaces adapt themselves to the oil volume so that no further rise in temperature occurs. Similarly the equalizers ensure that upon cooling of the oil the transmission pressure does not fall excessively. Since the valves 12 and 13 that control fluid flow to the rotary hydraulic motor are fixedly arranged in the casing and are connected by pipes to the motor and to the supply and return lines, the exact adjustment of the timed operations of these valves in relation to the setting of the valve is very troublesome or very difficult. In order to permit easy and exact adjustment, the invention contemplates an arrangement as illustrated in FIGURE 3. In this figure is shown the upper and lower part of an externally threaded spindle 100 similar to spindle 18. This spindle is driven by the hydraulic motor as is spindle 18. On this spindle are mounted two nuts 101 and 102. While the upper impact valve is not shown, there is illustrated in the lower half of FIGURE 3 a fixedly mounted impact valve 103, similar to valve 12. The casing of this valve is carried by a suitable support, not shown, within the common casing 5 of the unit. The line 104 diagrammatically indicates the upper part of the plate above the motor unit, likewise not shown.

Each of the nuts 101 and 102 is provided with a plurality of slots 105 extending axially of spindle 100 and distributed around the periphery of the nuts. For co-operation with these slots 105, a rail 106 is pivotally connected at its lower end to a support 107 so that it can be swung to and from a position in engagement with the slots of the nuts 101 and 102. FIGURE 3 illustrates the rail 106 in locking condition in the full line showing and in its inoperative position in the dotted line showing. The upper end of the rail 106 is provided with a notch 108 which fits over a screw or bolt carried by a fixed support 110. Wing nut 109 fastens the rail 106 in its full line position in engagement with slots 105 in the nuts 101 and 102.

In order to adjust the exact instant of actuation of the impact valves responsive to turning movement of spindle 100 via drive from hydraulic motor 1, it is only necessary to move rail 106 into the tilted inoperative position and then rotate nuts 101 and 102 as desired to move them to or from one another the amount required to provide the proper adjustment. In this connection it is only necessary to take care that in the finally adjusted position the slots 105 of the respective nuts are in alignment so that the rail 106 can engage in these slots to hold the nuts against any relative movement with respect to the spindle. With the arrangement as shown in FIGURE 3 the exact adjustment of the valve arrangement can be effected in a simple and reliable manner. It is clear that in this connection the casing 5 can be removed and it is disconnected from the base plate so as to provide access to the adjusting means for the nuts that operate the impact valves.

In order to prevent the necessity of providing any special seals such as around the indicator 36, the invention contemplates an arrangement where the indicator scale may extend parallel to the axis of the spindle in a separate extension of the casing and an indicator can be provided that projects radially from one of the nuts and which extends into this extension of the casing so as to co-operate with the scale. In this arrangement the indicator would move axially with the nut in response to turning of the rotor of the hydraulic motor.

In FIGURE 4 there is diagrammatically illustrated a further embodiment of the components within the sealed casing. The rotary motor illustrated diagrammatically at 101 is connected with the valve to be controlled, not shown. The shaft of this motor can be either directly connected to the valve spindle or linkage or reduction gearing can be interposed between the motor and the actuating spindle or linkage for the valve. In addition, this motor 101 further drives a control cam 102 which influences the position indicator 161 the movement of which actuates the transmitter 146 of a telemotor or follow-up system that provides for an indication of the valve setting at a remote point. The transmitter includes the resilient bellows 163, 164 which transmit impulses through the fluid in the conduits 150a, 151a to a receiver such as 60 in FIGURE 2. The connection between the indicator 161 and the respective bellows is indicated by the connecting rod 162.

The motor 101 is reversible and can be driven in opposite directions of rotation to effect the reverse movements of the valve to be controlled. In order to change over from one direction of rotation to the other the two conduits 109 through which the pressure fluid and exhaust flows in the casing are controlled by change over valve 151 of known structure. It will be assumed that in FIGURE 4 the right hand conduit 109 is receiving oil under pressure when the valve to be controlled is being opened and the left conduit 109 accommodates the oil under pressure when the valve is moving to closed position. Thus the conduit S communicating with the valve 151 is in communication with the pressure line of the hydraulic system and conduit T is in communication with the return line to tank. In the right hand feed line 109 there is provided a mechanically actuated cut-off valve means 112 in parallel with which is included a non-return valve 155 which ensures that during the closing operation of the main valve to be controlled in response to reverse actuation of valve 151 the fluid from the motor 101 can return to tank through the right hand line 15, 109 and valve 151 via non-return valve 155. The shut-off valve in the valve means 112 is actuated as in FIGURE 1 by a camming device which can constitute a nut carried by a spindle that moves axially in response to rotation of the hydraulic motor. The operation in this flow path is the same as in FIGURE 1. In the left hand feed line 109, 16 there is interposed a non-return valve 180 which when oil is being fed to right hand line 15 operates to permit oil to flow from the motor through pipe 16 past valve 180, through valve 151 to tank when oil is flowing into the motor through pipe 15. During the closing operation when the fluid under pressure must flow through pipe 16 toward the motor its path from the left hand line 109 to pipe 16 is past an adjustable feed valve 181, the adjustment of which incorporates spring means that can be adjusted so that the pressure of the oil fed to the motor via pipe 16 is lower by a predetermined amount than the oil pressure in right hand feed line 109 or the oil pressure in line 15 that is fed to the motor during a valve opening operation. This relationship ensures that during the closing of the valve to be controlled it is brought into closed position with lower torque than is available during a valve opening operation. As soon as the valve to be controlled reaches its end position the hydraulic motor comes to rest automatically since there is no further flow of oil due to closing of the mechanical actuated cut-off valves such as 112. The feed relationship shown in FIGURE 4 can be incorporated in a plurality of valve actuating arrangements that are fed from a common hydraulic supply system. Such a system is illustrated in FIGURE 5. In this figure conduits 201 and 200 respectively illustrate a supply and return line for a plurality of hydraulic valve actuating arrangements 150 that are mounted in parallellism with one another. Reference numerals 151 diagrammatically indicate the change over valves that govern the flow to and from the rotary hydraulic motors in the valve actuating units.

The oil under pressure in supply line 201 is obtained from a pressure source diagrammatically illustrated at 250. This source includes at least one feed pump 251 driven by an electric motor 252. In order to ensure positive and certain actuation of the valves to be controlled it is preferable to provide two pumping units that feed to a common supply line 253. The second pumping unit incorporates the same elements as the first and is denoted in FIGURE 5 by the same reference numerals with the addition of the letter b to such reference numerals. Thus oil pumps 251, 251b draw oil from tank or reservoir 255 through magnetic filter devices 256. The discharge or delivery pipe from each said pump has associated therewith an excess flow valve 257, 257b, a non-return valve 258, 258b, a pressure indicator 259, 259b and a selectively closed valve 260, 260b as discussed hereinafter. The two lines from the respective pumps merge into a common supply line 253. From the return line 200 there is a return line or pipe 261 which communicates with the tank 255. In the pressure line 253 in advance of the points of utilization of the pressure oil there is a branch pipe 271 which is turn is branched and communicates with oil pressure accumulators 270 which operate in a known manner to take up pressure variations in a supply line. These accumulator include a compressed gas reservoir on top of a piston as is conventional with the so called oleo-pneumatic accumulators. A pressure indicator 272 is in communication with the branch line 271 and a pressure responsive or sensitive switch means 280 that controls the operation of a protecting switch 281 that in turn controls the electric driving motors 252, 252b is also so arranged that oil under pressure flows from pipe 271 to the pressure responsive switch 280, switch 281 being in circuit with the respective motors 252, 252b. It is to be assumed that the maximum permissible supply pressure in pipe 253 is to be at approximately 160 atmospheres. The working pressure for the hydraulic actuating means 150 is to be about 130 atmospheres. In this case the pressure responsive switch 280 is so constructed that it switches off motors 252, 252b where the maximum permissible pressure of 160 atmospheres is obtained in supply pipe 253. On the other hand, these motors are switched on again when the pressure in the supply pipe line 253 falls below a minimum value, for example, 140 atmospheres. Since the number of valves which are to be actuated at the same time very quickly one after another may vary greatly at different control times, namely several motor running times must be ensured, it is difficult to select a feed pump which is suitable for all requirements. If, for example, the design or capacity of said feed pump 251 is such that three main valves can be actuated in a given time interval, then upon actuation of one main valve a sudden excess oil pressure arises. The effect of this is that the cut-off pressure of 160 atmospheres is reached soon after the pump has started. The pressure responsive switching device 280, 281 thereupon switches off the pump. However, since the hydraulic motor for the valve to be actuated consumes oil, the accumulators meet this requirement in part. For various reasons the accumulators cannot be as large as might be desired. The effect of this is that the pressure in the supply line 253 rapidly falls again when the hydraulic actuating motor runs again and the feed pump is cut in. The driving motor 252 and the feed pump 251 will then hunt i.e. they will be intermittently switched on and off continuously. This represents a great disadvantage as has been explained in detail beforehand. In order to deal with this disadvantage the invention contemplates the constructions of the pressure responsive or sensitive switching device 280 in such a manner as to avoid hunting of an electric motor unit(s). Such construction is shown in FIGURE 6.

In FIGURE 6 the driving motor for the feed pump 251 is again indicated at 252, the motor being an electrical alternating current motor. Between the electrical supply lines indicated at R, S and T and each driving motor 252, 252b is included the protecting switch 281 for the motor. The actuation of the protecting switch takes place as already mentioned above in accordance with the manner of operation of the pressure sensitive switch device 280. For this purpose the holding coil 350 of the protecting switch 281, the holding contact of which is indicated at 351, is in series with the switch contact 352 of a delay relay 353 the delay member of which is connected to line R and T through contacts controlled by the pressure sensitive switch device 280. The contacts of this device are indicated at SK1 and SK2 the latter controlling the relay 353. The manner of operation of these contacts and of the pressure responsive switch means can be seen from the drawing without further description.

In the position illustrated the device is cut out. As soon as the control circuit is connected to the supply system by actuation of the switch 360 the holding relay 350 of the protecting switch is energized when the pressure does not exceed the value of 140 atm. If due to the working of the feed pump the pressure rises then the relay SK1 is switched off but the holding coil 350 of the protecting switch remains connected since in the meantime the holding contact 351 has been closed by the switching on of the protecting switch. If the pressure in the supply pipe reaches the value of 160 atm. then the contacts SK2 of the switch device are closed and thereby a cut-out impulse is fed to the delay relay device 353. After the expiration of the predetermined delay time this relay device opens the contact 352 so that the supply current circuit for the holding coil 350 of the protecting switch is interrupted and the protecting switch is cut out. If prior to the opening of the contact 352 the pressure in the supply pipe should fall below the operating value due to the actuation of a plurality of hydraulic actuating means, then the contacts SK2 open again and the delay device 353 is thereby returned to its initial condition without the contact 352 being opened. This arrangement and construction of the pressure sensitive switch device prevents continuous hunting of the pump aggregate of the supply system. During the operating time of the delay relay 353 the excess flow valves 257 and 257b, FIGURE 5, prevent the maximum pressure in the feed pipe 253 from being exceeded. If the pressure should again fall during the operating time of the relay then the valves 257 and 257b immediately close again so that no loss of pressure occurs in the pipe.

A further possibility of counteracting hunting and above all of equating the pump delivery to the actual maximum requirement consists in the provision of a throttle valve 400 between the supply line or pipe 253 and the return pipe 261. This valve ensures that if the pump delivery is too high, a part of the delivered liquid can flow directly into the return pipe. This constitutes a safety measure for preventing excess pressure in the supply pipe and unnecessary heating of the oil.

As already mentioned above, the working pressure for the hydraulic valve actuating means 150 is lower than the minimum value maintained by the control device in the supply pipe 253; if this minimum value is 140 atm. then the supplied working pressure in the hydraulic actuating means may amount to approximately 130 atm. In order to withhold the pressure difference necessitated by the pressure responsive or sensitive switch means 280 and the pressure variations thereby caused in the feed pipe from the hydraulic actuating means it is desirable to provide a pressure reducing valve 420 in the supply pipe, after the accumulators and after the pressure sensitive switch means so as to ensure that the oil pressure on the output side is maintained constantly at about 130 atm. independently of the pump pressure on the input side. An excess flow valve 300 is arranged following the reducing valve 420 and serves merely to convey leakage from the reducing valve 420 into the return pipe. The adjustment of the excess flow valve 300 must then of course be effected to correspond. Such removal of the leakage oil is necessary since with the system at rest it would lead to an increase in the oil pressure in the pipe 201. The pressure reducing valve 420 affords above all the possibility of operating the pressure accumulator with an oil pressure which is appreciably higher than the operating pressure in the valve actuating motors, and when the pumps cut out sufficient pressure is available for the valve operations still necessary notwithstanding relatively small accumulator capacity.

It has been found in practice that with installations newly taken into service there is always some loosening of dirt in the pipes even if these are very carefully worked over and cleaned. The result is that the loosened sludge becomes deposited in the important instruments and fittings of the hydraulic system. The filters 256 provided have not proved to provide complete protection against this dirt since obviously many of the dirt particles are of non-magnetic nature. The effect of such impurities is inter alia that after the maximum pressure of 160 atm. has been reached with the pump cut out the pressure falls in a very short time since the non-return valves which are always arranged in the supply pipe to follow the pumps no longer close tightly. Repair of these valves is so time-consuming and difficult that the examination of the valves necessitates the pump being out of service for a long time, especially since the pumps are generally arranged within the reservoir at places which are not easily accessible. In order to remove these disadvantages it has been proved desirable to provide in the supply pipe or line in front of the non-return valve 258 (in the direction of the flow) a selectively closable valve 260. The non-return valve 258 should be of simple construction and of a type which with only a few manual operations can be replaced by another non-return valve so that the periods when the system is out of operation are only short. Other selectively operated valves 260a are provided throughout the system to permit isolation of parts of the system and to facilitate further cleaning or draining as may be necessary.

What is claimed is:

1. Hydraulic actuating means for valves, particularly for actuating valves controlling the loading and unloading of tanker vessels comprising a self contained unit including a reversible rotary hydraulic motor, means driven by said motor and adapted to be coupled to a valve to be actuated to move the same between open and closed positions, a fluid tight, oil-filled casing, said motor being mounted within said casing, said means adapted to be coupled with the valve including a movable member driven by the motor, positioned exteriorly of the casing and movable in opposite directions as a function of the position of an associated valve, fittings associated with said casing, fluid accommodating conduit means within the casing and connected between said motor and said fittings and adapted to provide two reverse fluid paths to and from the motor whereby responsive to passage of fluid under pressure through said conduit means said motor operates in reverse directions and means positioned within the casing and operably related to said conduit means for stopping fluid flow to said motor when at least one predetermined position of the movable member has been reached.

2. Hydraulic actuating means as claimed in claim 1 in which the last mentioned means comprises a mechanically actuated impact valve means incorporated in the conduit means, camming means for actuating said impact valve means and means for moving said camming means in response to turning movement of the hydraulic motor.

3. Hydraulic actuating means as claimed in claim 2 in which said conduit means within the casing comprises two lines of piping extending between said fittings and said motor so that when fluid under pressure flows through one line to drive the motor in one direction, return flow of fluid is accommodated by the other line, said mechanically actuated impact valve means being arranged in one line and an additional mechanically actuated impact valve means arranged in the other line, said camming means also co-operating with said additional mechanically actuated impact valve means whereby both said mechanically actuated impact valve means are alternatively operated to stop flow of fluid under pressure to said motor when said movable member has reached its opposite end positions.

4. Hydraulic actuating means as claimed in claim 1 and further including a valve position indicating means having movable components mounted within the casing and a hydraulic impulse transmitting means disposed within the casing and actuated by said indicating means and adapted to transmit impulses to a remote point.

5. Hydraulic actuating means for valves as claimed in claim 4 and further including a hydraulically actuated indicating means positioned remotely from said casing and including a receiver, conduit means extending between said receiver and said impulse transmitting means, said receiver and impulse transmitting means each including two variable volume cylinders and conduit means connecting the respective cylinders of the receiver with the cylinders of the transmitting means whereby the movement of the indicating means in the casing is duplicated at a remote point.

6. Hydraulic actuating means as claimed in claim 1, in which a valve means including a pressure reducing a non-return valve means is incorporated in the conduit means which feeds the motor during the movement of the movable member from one to another end positions corresponding to movement of the valve to be actuated from open to closed position so that the oil pressure supplied during movement of the member during valve closing movement is lower by a predetermined amount than the oil pressure supplied during movement of the member during valve opening movement.

7. Hydraulic actuating means for valves comprising a self-contained unit including a sealed, oil-filled casing, a reversible rotary hydraulic motor within the casing, means driven by said motor and including a stub shaft projecting exteriorly of the casing and adapted to be coupled to a valve to be actuated whereby the rotary position of the stub shaft is a function of the position of such a valve, conduit means within the casing and communicating with the motor to provide for two reverse fluid flow paths so that the motor can rotate in opposite directions, to effect movement of said stub shaft to impart valve opening and closing movements, when pressure fluid is supplied to said conduit means, an externally threaded spindle driven by said motor and positioned within the casing, a nut means mounted on said spindle for opposite axial movements therealong responsive to rotation of the spindle, a movable control means operably related with the conduit means providing one of said reverse fluid flow paths and including an impact member in the path of movement of said nut means as to be engaged thereby when said stub shaft has reached a predetermined position so as to shut off fluid flow to said motor via said one path.

8. Hydraulic actuating means as claimed in claim 7 and another externally threaded spindle within the casing, said another spindle being driven by said motor, means coupling said another spindle with said first mentioned spindle so as to drive the latter from said motor, a second nut mounted for axial movement along said another spindle, an arm extending from said nut, a lever means pivoted at one end within said casing, a guide along said lever, a follower on said arm co-operating with said guide so as to move the lever in response to movement of said second nut, and movable indicating means connected to said lever to indicate the position of a valve to be actuated as a function of the rotary movement of said another spindle.

9. Hydraulic actuating means as claimed in claim 8 and another arm rigid with said lever so as to constitute therewith a bell crank, linkage means connected to said another arm, and an hydraulic indicating impulse transmitter within the casing and movable in response to movement of said linkage means to intitiate an indicating impulse adapted to be received at a remote point.

10. Hydraulic actuating means for valves comprising in combination with a valve to be actuated between opened and closed positions, a self-contained unit including a sealed, oil-filled casing, a reversible rotary hydraulic motor within the casing, means driven by said motor and including a movable member projecting exteriorly of the casing and adapted to be coupled to such valve to be actuated, conduit means within the casing and communicating with the motor to provide for two reverse fluid flow paths so that the motor can rotate in opposite directions, to effect movement of said member to impart valve opening and closing movements, when pressure fluid is supplied to said conduit means, an externally threaded spindle driven by said motor and positioned within the casing, a nut means mounted on said spindle for opposite axial movements therealong responsive to rotation of the spindle, a movable control means operably related with the conduit means providing one of said reverse fluid flow paths and including an impact member in the path of movement of said nut means as to be engaged thereby when said valve has reached a predetermined position so as to shut off fluid flow to said motor via said one path.

11. Hydraulic actuating means for valves, particularly for actuating valves controlling the loading and unloading of tanker vessels comprising a valve to be moved between opened and closed positions, a self-contained unit including a reversible rotary hydraulic motor, means driven by said motor and adapted to be coupled to a valve to be actuated to move the same between open and closed positions, a fluid tight, oil-filled casing, said motor being mounted within said casing, said means adapted to be coupled with the valve including a stub shaft driven by the motor, positioned exteriorly of the casing and movable in opposite directions as a function of the position of said valve, fittings associated with said casing, fluid accommodating conduit means within the casing and connected between said motor and said fittings and adapted to provide two reverse fluid paths to and from the motor whereby responsive to passage of fluid under pressure through said conduit means said motor operates in reverse directions and means positioned within the casing and operably related to said conduit means for stopping fluid flow to said motor when at least one predetermined position of the valve to be actuated has been reached.

References Cited by the Examiner

UNITED STATES PATENTS

| 1,799,113 | 3/31 | Miedbrodt | 60—97 |
| 2,979,908 | 4/61 | Shook | 60—97 |
| 3,037,484 | 6/62 | Dixon | 121—38 |
| 3,071,117 | 1/63 | Sizer | 121—38 |

JULIUS E. WEST, *Primary Examiner.*

EDGAR W. GEOGHEGAN, *Examiner.*